(12) United States Patent
Aylsworth

(10) Patent No.: US 6,379,105 B1
(45) Date of Patent: Apr. 30, 2002

(54) AUTOMATIC LUMBER UNLOADING AND FEEDING APPARATUS

(76) Inventor: Steven L. Aylsworth, 9423 9th St. SE., Chatfield, MN (US) 55923

( * ) Notice: Subject to any disclaimer, the term of this patent is extended or adjusted under 35 U.S.C. 154(b) by 0 days.

(21) Appl. No.: 09/510,019

(22) Filed: Feb. 22, 2000

(51) Int. Cl.[7] .............................................. B65G 59/00
(52) U.S. Cl. ............................... 414/796.2; 414/797.9; 414/797.4; 198/459.1; 198/459.4; 198/463.4; 221/296; 221/298
(58) Field of Search ................................ 221/296, 298; 414/796.2, 797.9, 797.4; 198/459.1, 459.6, 463.4, 419.1

(56) References Cited

U.S. PATENT DOCUMENTS

| 2,730,144 | A | * | 1/1956 | Joa .............................. 221/298 |
| 3,873,000 | A | * | 3/1975 | Eaton et al. ................. 221/298 |
| 3,952,883 | A | * | 4/1976 | Phillips .................... 414/797.9 |
| 4,323,169 | A | * | 4/1982 | Guigan ....................... 221/298 |
| 4,640,655 | A | | 2/1987 | Jacobsen |
| 4,838,748 | A | | 6/1989 | Johnson |
| 5,249,915 | A | | 10/1993 | Ritola |
| 5,788,467 | A | | 8/1998 | Easton et al. |
| 5,879,129 | A | | 3/1999 | Newnes et al. |
| 5,899,659 | A | | 5/1999 | Beilsmith |

FOREIGN PATENT DOCUMENTS

| DE | 001153315 A | * | 8/1963 | .............. 198/459.6 |
| DE | 3722285 | * | 1/1989 | .............. 414/797.9 |

OTHER PUBLICATIONS

Lumber unloader manufactured by The Koskovich Co., 905 N Broadway, Rochester, MN 55906; Figs. 1–6 with description.

* cited by examiner

Primary Examiner—H. Grant Skaggs
(74) Attorney, Agent, or Firm—Dorsey & Whitney LLP

(57) ABSTRACT

The present invention provides a lumber unloading and feeding method and apparatus that can reliably separate individual boards from a stacked unit and feed the individual boards into other automatic machinery. One embodiment comprises a first load supporting surface and a second load supporting surface that cooperate to support a first end and a second end of at least one tier; a tier receiver located below the first and second load supporting surfaces; a first pusher that biases the first end of the tier off the first load supporting surface; and a second pusher that biases the second end of the tier off the second load supporting surface, thereby allowing the tier to drop onto the tier receiver. Another embodiment the acts of placing a plurality of tiers on a first load supporting surface and a second load supporting surface, the plurality of tiers including a first, bottom tier; pushing a first end of the first, bottom tier off the first load supporting surface; and pushing a second end of the first, bottom tier off the second load supporting surface. This allows the tier to drop onto a tier receiving surface, such as a conveyor.

Another aspect of the present invention is a method and apparatus for separating an item from a plurality of items on a conveyor. One embodiment comprises the acts of using the conveyor to bias the plurality of items against a stop; lifting all but one item in the plurality of items off the conveyor; and removing the stop, whereby the conveyor biases the one item into a discharge area. This method may be repeated as necessary to separate the remaining items.

18 Claims, 9 Drawing Sheets

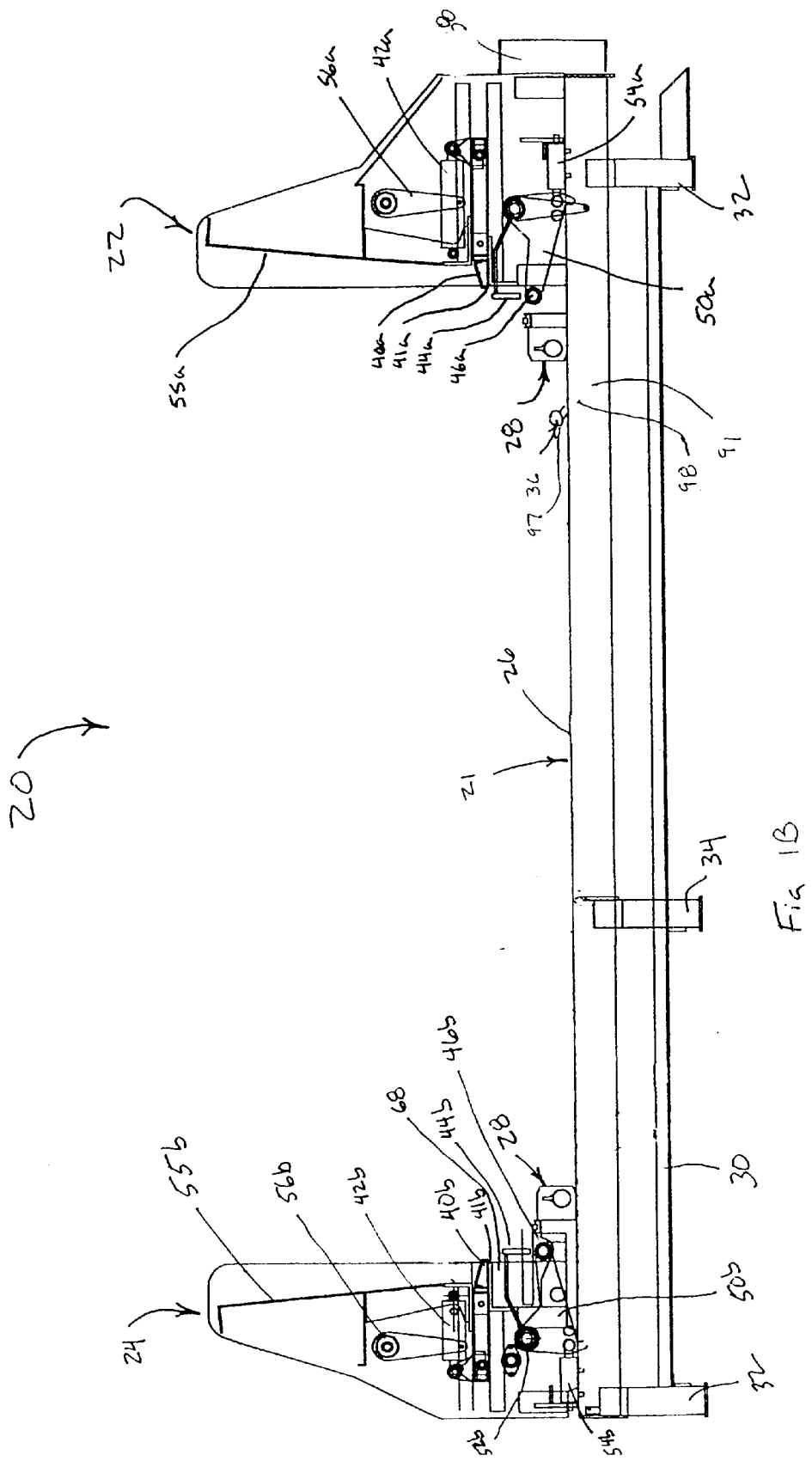

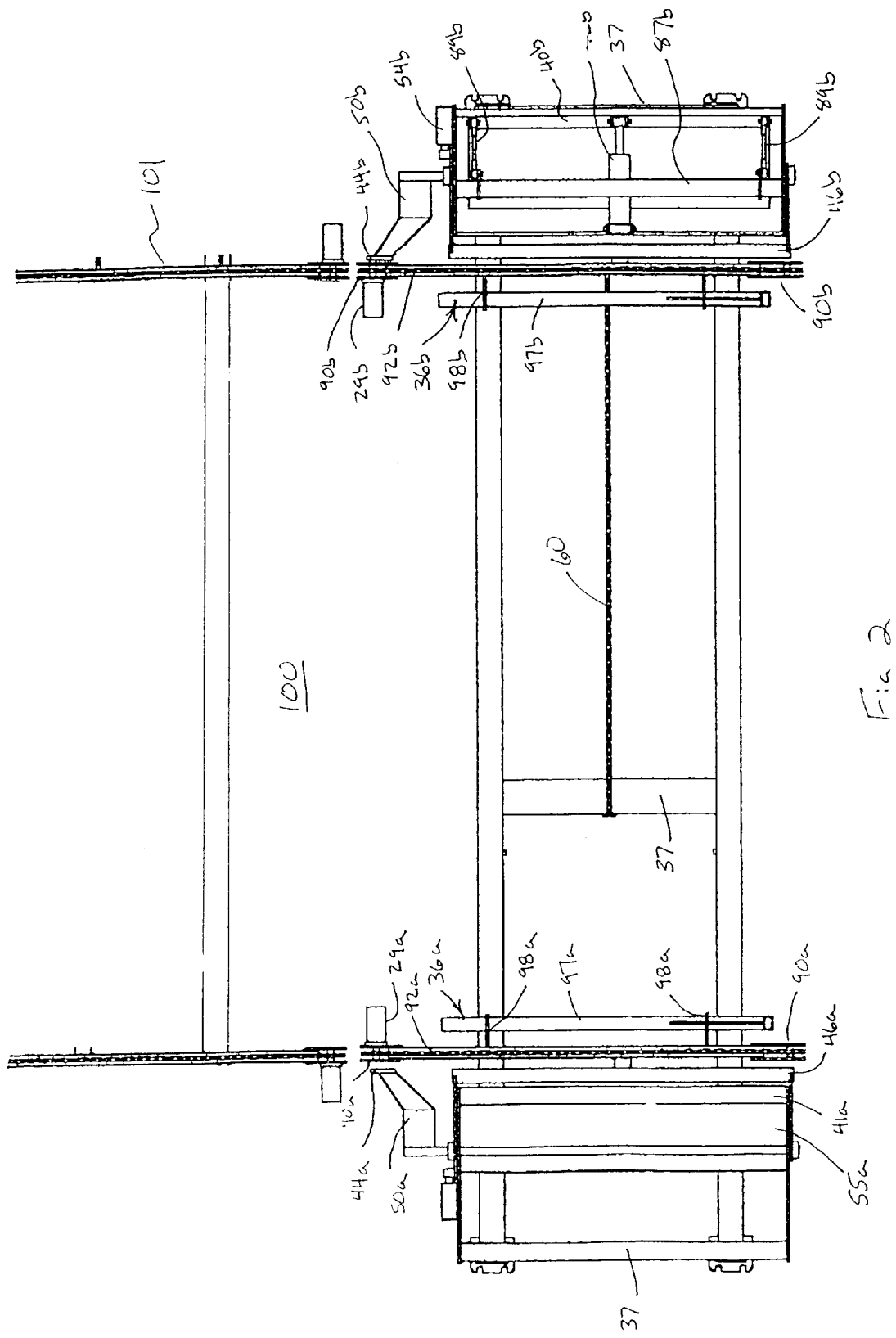

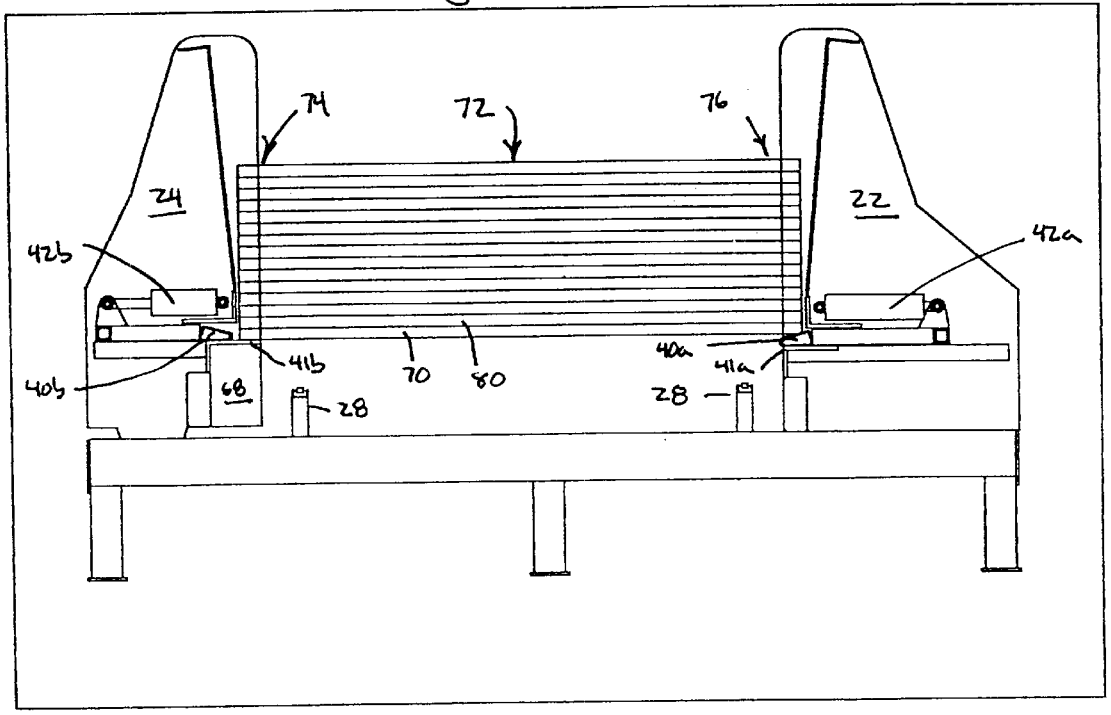
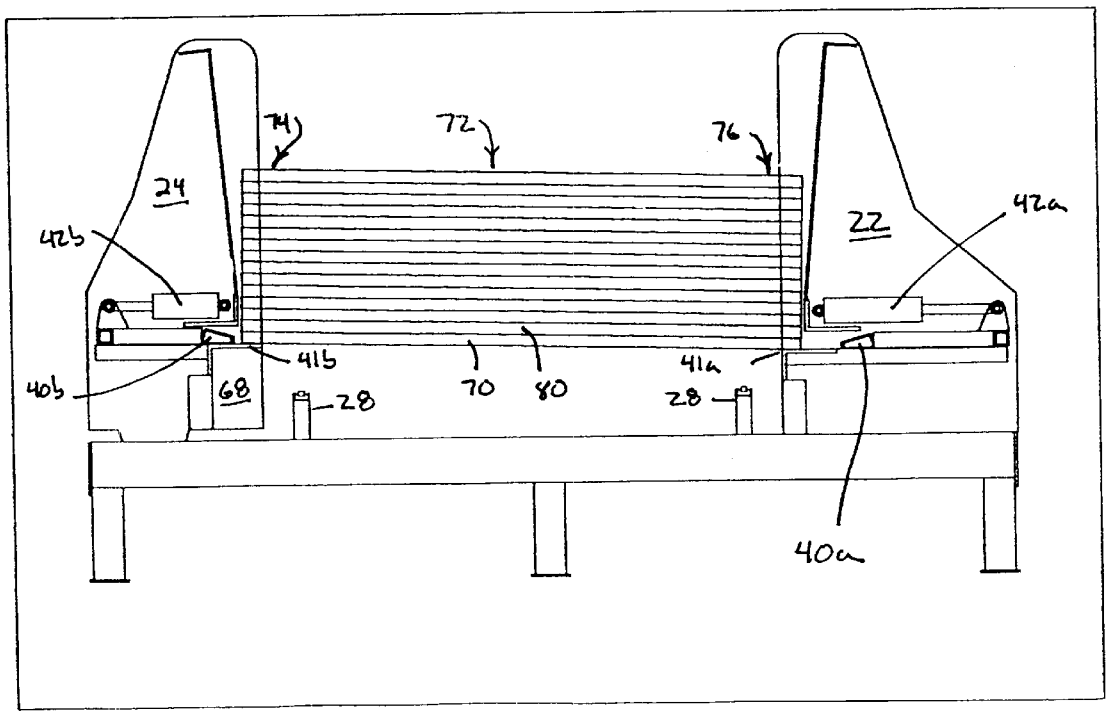

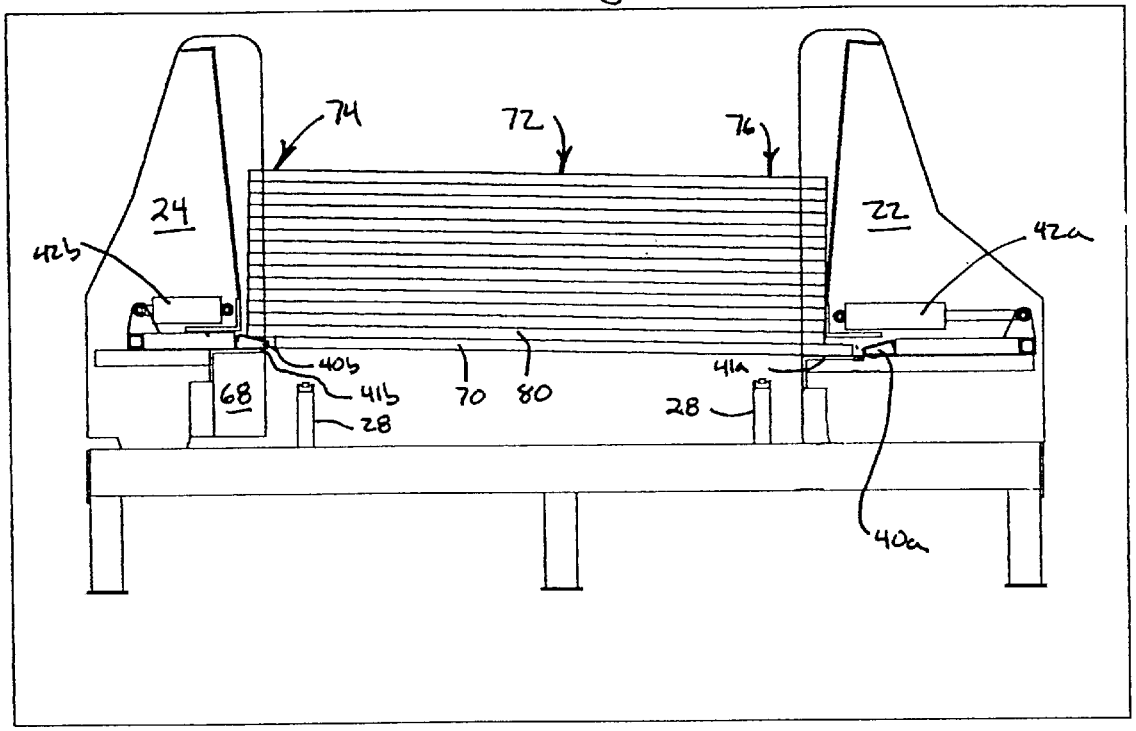
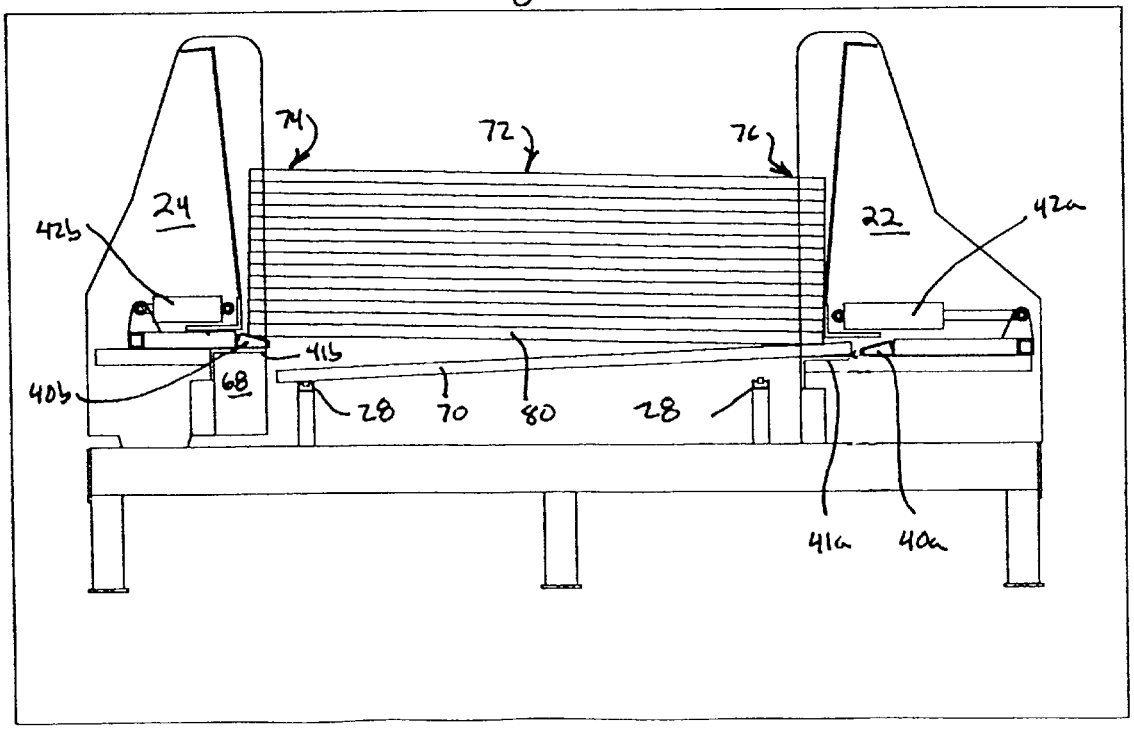

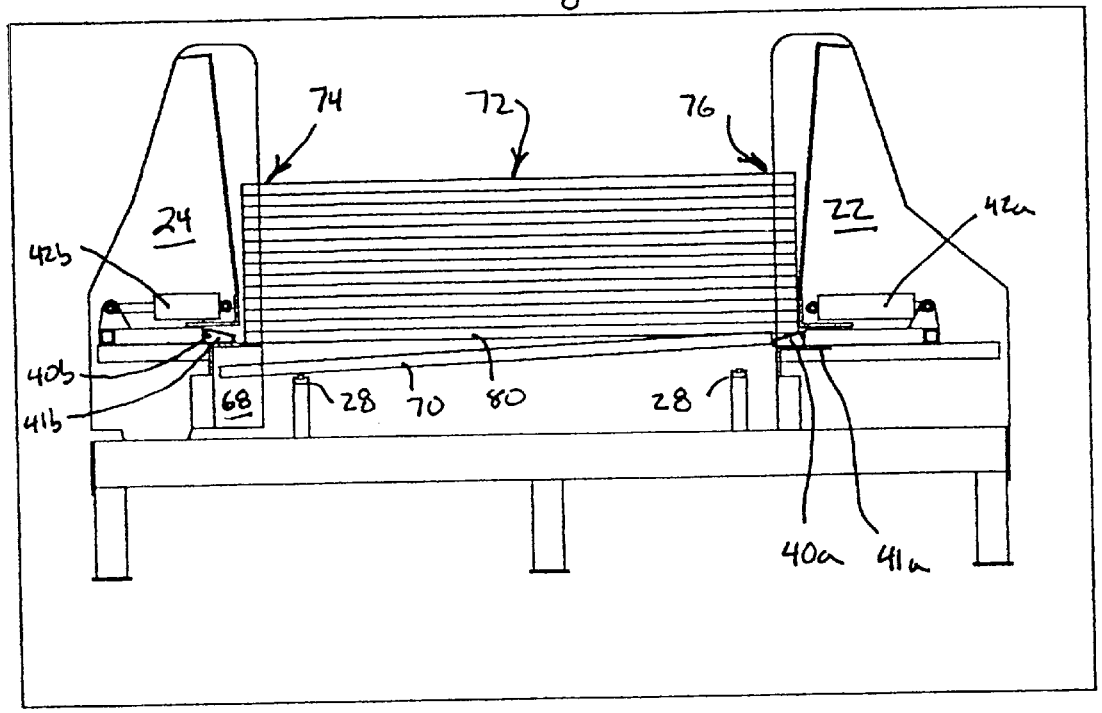
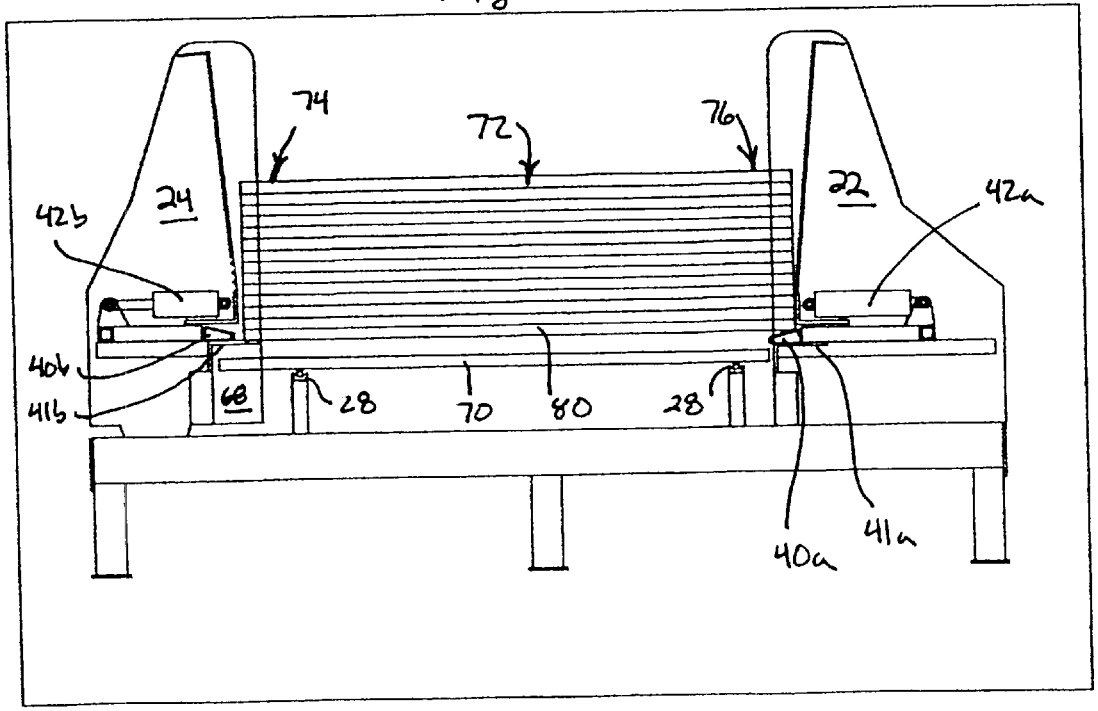

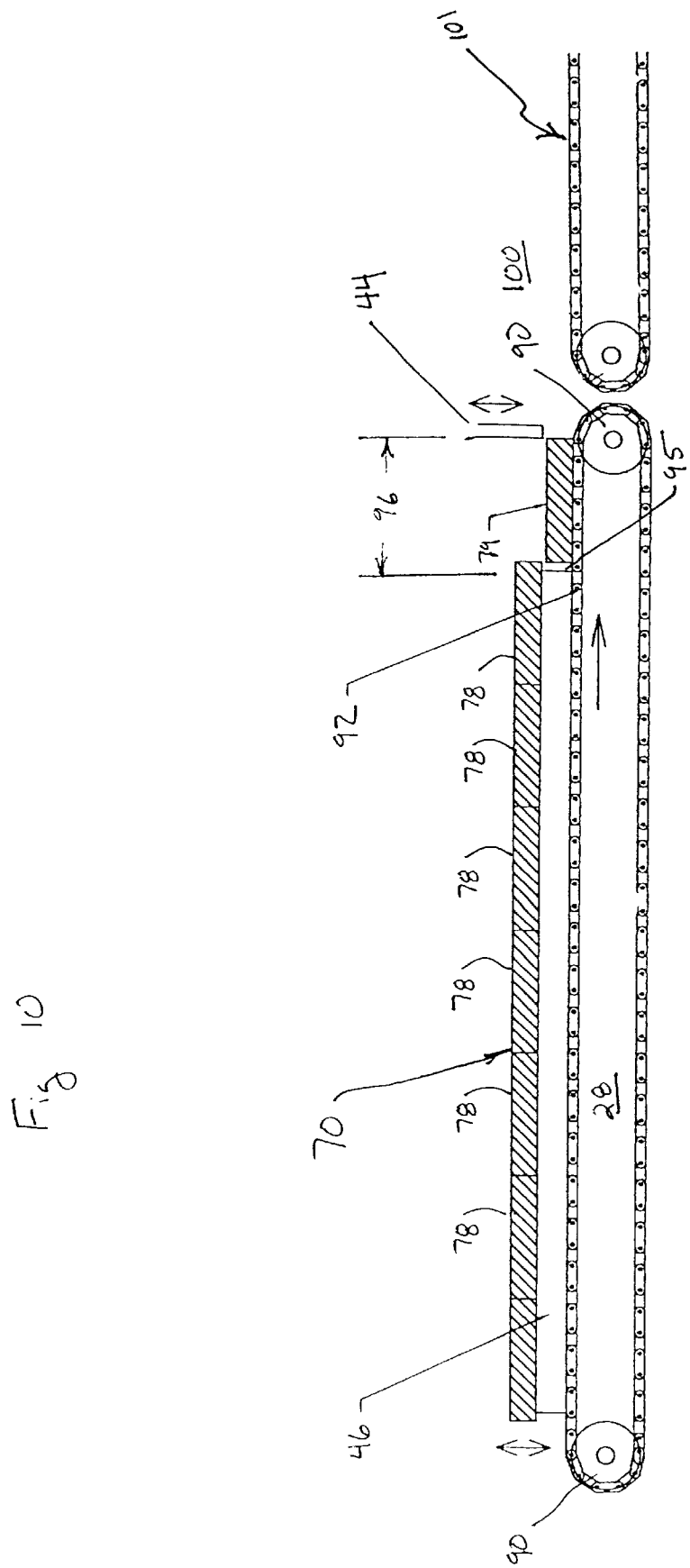

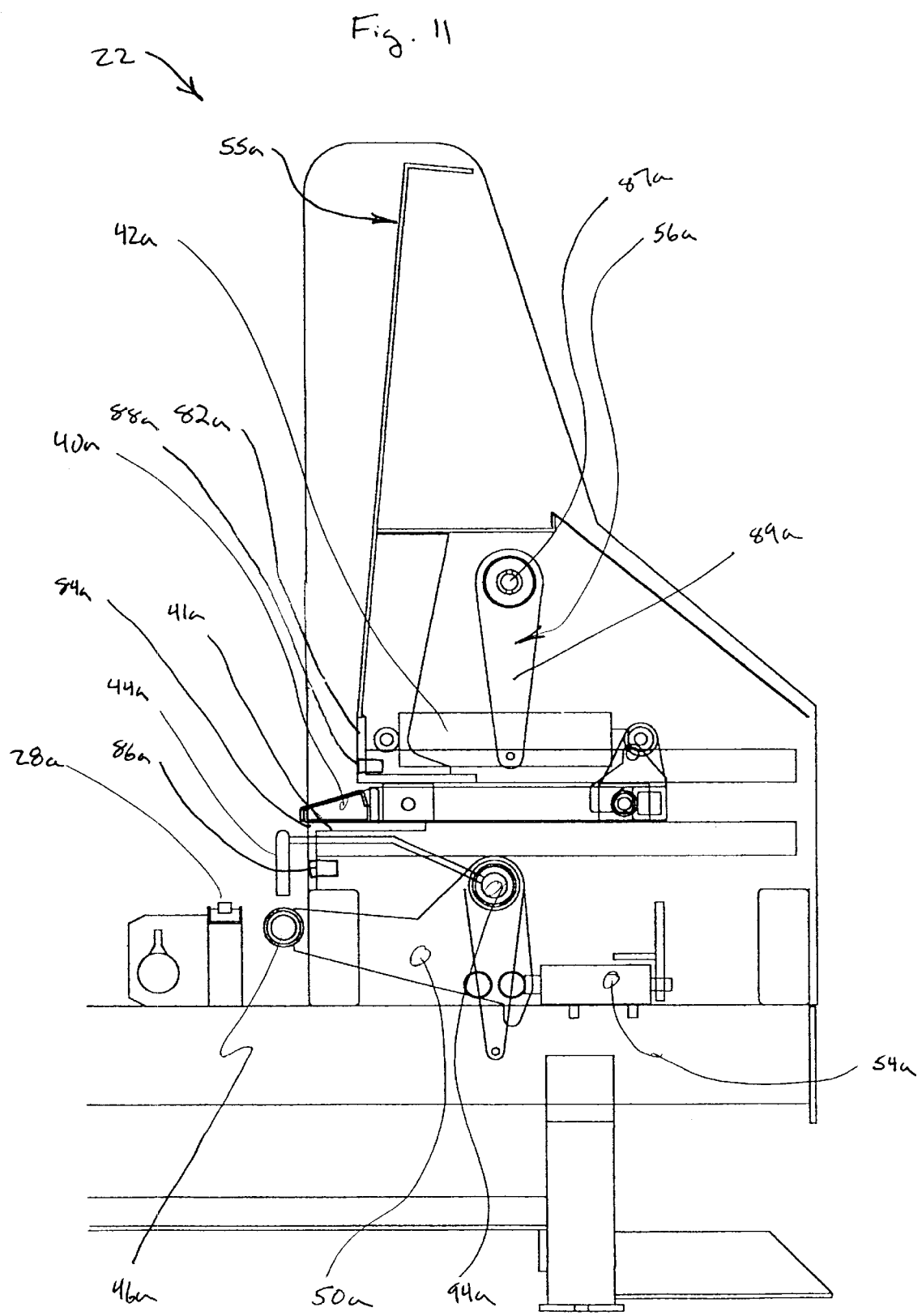

AUTOMATIC LUMBER UNLOADING AND FEEDING APPARATUS

FIELD OF THE INVENTION

The present invention generally relates to a method and apparatus for unloading and feeding items from a tiered stack, pile, or the like. More particularly, the present invention relates to an apparatus for receiving, separating, and continuously feeding boards from a unit of lumber.

BACKGROUND OF THE INVENTION

Manufacturing companies typically receive lumber boards in large units or bunks. Each unit or bunk consists of several dozen individual boards that are stacked in horizontal rows (or "tiers") and vertical columns. A lumber unloading and feeding apparatus ("bunkfeeder") breaks down the units into individual boards and substantially continuously delivers the individual boards into another machine, such as an automatic or computer-controlled saw.

Because the bunkfeeder supplies other automatic machinery, it should be efficient and a reliable in its manipulation of the unit and in its delivery of individual pieces to the next processing station. The timing and sequencing of the breakdown process should be carefully considered and orchestrated to minimize interruptions in its output. The goal, generally, is to provide a substantially continuous output of individual boards. The bunkfeeder should also be capable of handling boards with different lengths, widths, and heights. This feature is particularly desirable when the bunkfeeder is used with computer controlled saws, because the manufacturer can use the same equipment to produce a variety of items. That is, the manufacturer can change its production by changing the size/length of boards to be fed and altering the commands given to the automatic saw and to the bunkfeeder. In addition, the bunkfeeder should be capable of handling units with different lengths, widths, heights, and number of boards.

U.S. Pat. No. 4,640,655 to Jacobsen, U.S. Pat. No. 4,838,748 to Johnson, and U.S. Pat. No. 5,249,915 to Ritola all disclose apparatuses for separating individual tiers from a tiered load. All three apparatuses pivot the unit into a load travel path, then advance the unit along the travel path toward a discharge point. At the discharge point, the top row of the load is allowed to slide down an inclined surface onto a conveyor belt. One problem with these devices, however, is that friction will cause some boards in the top row to stick to the adjacent row and release unexpectedly, which can lead to log jams at the bottom of the inclined surface. In addition, these apparatuses do not separate the individual boards and can spill the loads during their tilting step.

Accordingly, there is a need for a lumber unloading and feeding apparatus that can reliably break down units of lumber into individual boards. There is also a need for a lumber feeding apparatus that can receive different sized boards and different sized units.

SUMMARY OF THE INVENTION

The present invention provides a lumber unloading and feeding apparatus that can reliably separate individual boards from a stacked unit of lumber and that can feed the individual boards into other automatic machinery. One aspect of the present invention comprises an apparatus for separating items from the bottom of a tiered load. One embodiment of this apparatus comprises a first load supporting surface and a second load supporting surface that cooperate to support a first end and a second end of at least one tier; a tier receiver located below the first and second load supporting surfaces; a first pusher that biases the first end of the tier off the first load supporting surface; and a second pusher that biases the second end of the tier off the second load supporting surface, thereby allowing the tier to drop onto the tier receiver. The tier receiving surface in this embodiment is a conveyor adapted to bias a plurality of items against a stop. This embodiment further comprises a lifter that biases all but one unit in the plurality of units out of engagement with the conveyor, which allows the conveyor to bias the one remaining item into a discharge area.

Another aspect of the present invention is a method of separating items from a tiered load. One embodiment of this method comprises the acts of placing a plurality of tiers on a first load supporting surface and a second load supporting surface, the plurality of tiers including a first, bottom tier; pushing a first end of the first, bottom tier off the first load supporting surface; and pushing a second end of the first, bottom tier off the second load supporting surface, whereby the first, bottom tier drops onto a tier receiver. In this embodiment, the first, bottom tier may include a plurality of items and the method may further comprise the acts of collecting the first, bottom tier against a stop and allowing one item in the plurality of items past the stop.

Still another aspect of the present invention is a method of separating an item from a plurality of items. One embodiment comprises the acts of using the conveyor to bias the plurality of items against a stop; lifting all but one item in the plurality of items off the conveyor; and removing the stop, whereby the conveyor biases the one item into a discharge area. This method may be repeated as necessary to separate the remaining items.

The present invention provides numerous advantages over conventional unloading and feeding machines. For example, the present invention allows manufacturers to insert an entire unit of boards into the bunkfeeder as the unit is received from the mill. This reduces the labor necessary to operate other unloading and feeding machines. The present invention can also fit into a relatively small space and can be adjusted to accept both standard and non-standard sized units of lumber.

These and other features and advantages will become better understood with reference to the following description, appended claims, and accompanying drawings.

BRIEF DESCRIPTION OF THE DRAWINGS

FIG. 1B is a side plan view of a discharge side of the bunkfeeder embodiment in FIG. 1A.

FIG. 2 is a top plan view of the bunkfeeder embodiment in FIGS. 1A and 1B, with portions of one side assembly removed to reveal some of the interior components.

FIGS. 3–8 are side plan views that illustrate sequential steps in using the bunkfeeder embodiment in FIGS. 1–2 to separate one tier of boards from the bottom of a unit.

FIGS. 9–10 are side plan views that illustrate sequential steps in using the conveyor assembly embodiment in FIGS. 1–2 to separate one board from a tier of boards.

FIG. 11 is a detailed plan view of the fixed side assembly, as viewed from the discharge side.

DETAILED DESCRIPTION

Figure 1A:
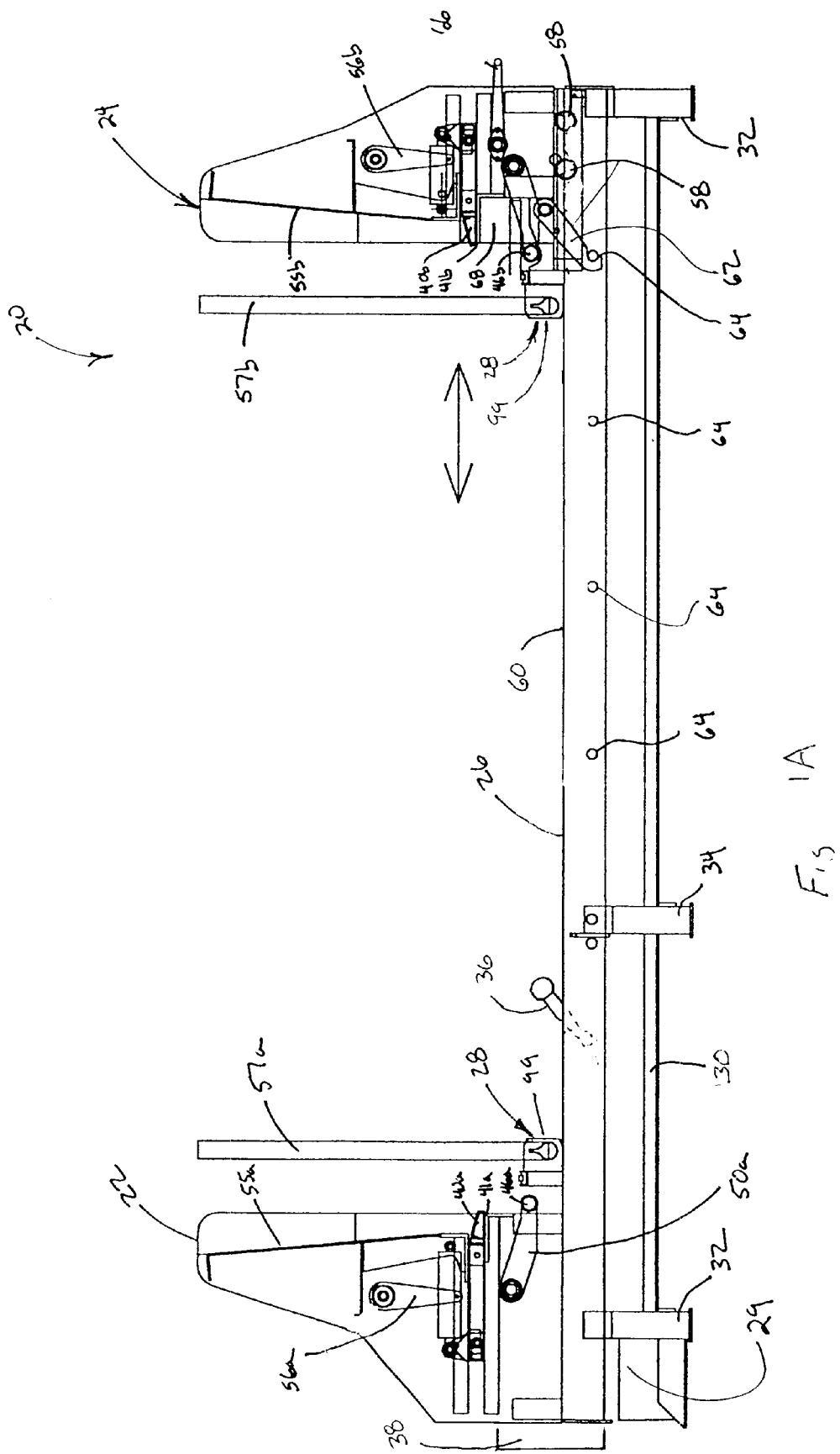
FIG. 1A is a side plan view of a loading side of one bunkfeeder embodiment.

FIGS. 1A and 1B are side plan views of one embodiment of a self-contained lumber unloader and feeding apparatus 20 ("bunkfeeder"). The bunkfeeder 20 in this embodiment comprises a base 21, a fixed side assembly 22, an adjustable side assembly 24, a pair of generally parallel rails 26 that connect the fixed side assembly 22 to the adjustable side assembly 24, a pair of generally parallel conveyor assemblies 28 mounted to extend generally perpendicularly between the rails 26, and a hydraulic power unit 29 that is hydraulically coupled to the both side assemblies 22, 24 by flexible hydraulic tubing (not shown).

The base 21 in this embodiment comprises a wiring and hydraulic tubing support tray 30, two pairs of legs 32 located generally underneath the side assemblies 22 and 24, a centrally located pair of legs 34, three generally transverse support bars 37 (see FIG. 2), one or more length adjustment chains 60 (see FIG. 2), and a series of pegs 64 attached to the outside surface of one or both rails 26.

The fixed side assembly 22 comprises a pushplate hydraulic cylinder 42a that is translationally fixed to a pushplate 40a by an appropriate mechanical linkage, a generally planar load supporting surface 41a, a finger stop 44a (see FIGS. 1B and 2) that is longitudinally (i.e., in a direction parallel to the conveyor assemblies 28) separated from a lifter bar 46a by a distance slightly greater than the width of the boards in the unit, and a lifter hydraulic cylinder 54a that is coupled to the finger stop 44a and the lifter bar 46a by a lifter arm 50a. The fixed side assembly 22 also comprises an angled load guide surface 55a, a synchronizing assembly 56a, and a pivoting guide arm 57a that can be selectively locked in a generally upright position. The fixed side assembly 22 further comprises a lumber holdup arm assembly 36 that is pivotally connected to the rails 26, and a programable logic unit ("PLC") 38 that controls the timing and duration of the actions described with reference to FIGS. 3–8 and to FIGS. 9–10.

The adjustable side assembly 24 in this embodiment similarly comprises a trapezoidal pushplate 40b, a planar load supporting surface 41b, a pushplate hydraulic cylinder 42b, a finger stop 44b (FIG. 1B), a lifter bar 46b, a lifter hydraulic cylinder 54b, an angled load guide surface 55b, a synchronizing assembly 56b, and a guide arm 57b. In addition, the adjustable side assembly 24 comprises a pinion 58 sized and positioned to engage the chain 60, a latch 62 that is sized and shaped to receive one of the pegs 64, a crank handle 66 capable of driving the pinion 58, and a longitudinal cavity 68 (see also FIGS. 3–8) that is sized and shaped to receive one end of a bottom tier during its separation and removal from the lumber unit. In this embodiment, the planar load supporting surface 41 a is slightly vertically offset from, or lower than, the planar load surface 41b.

FIG. 2 is a top plan view of the embodiment in FIGS. 1A and 1B, in which portions of the adjustable side assembly 24 have been removed to show some of the bunkfeeder's interior components. Those skilled in the art will recognize that the fixed side assembly 22 includes complementary structures. FIG. 2 also shows that each synchronizing assembly 56 comprises a torsion bar 87 that is linked to each end of the pushplate 40 by two lever arms 89, and shows that each conveyor assembly 28 comprises a drive motor 39 that rotates a circular or endless chain 92 around a pair of sheaves 90. In addition, FIG. 2 shows a discharge area 100 located adjacent to one side of the bunkfeeder 20. This discharge area 100 may be the input or loading area for another piece of automatic machinery 101.

In operation, the bunkfeeder 20 is loaded with a unit of lumber 72 using a forklift, an overhead crane, or a similar material handling device (not shown). The angled load guide surfaces 55a and 55b help the forklift's operator to direct the unit of lumber 72 into the position and orientation shown in FIG. 3. After the bunkfeeder 20 is activated by its operator, the bunkfeeder 20 first automatically separates and removes the bottom tier of boards 70 from the rest of the unit 72. Next, the bunkfeeder 20 will isolate a single board 78 from this separated bottom tier 70 and eject it into the discharge area 100. The bunkfeeder 20 continues to isolate and eject individual boards 78 from the separated bottom tier 70 until it has ejected all of the individual boards 78 in that tier 70. After the bunkfeeder 20 finishes one tier 70, the bunkfeeder 20 will separate and remove the next tier 80 (new bottom tier) from the bottom of the unit 72 and begin to isolate and eject its individual boards 78. This process may be repeated until the bunkfeeder 20 is empty.

FIGS. 3–8 are side plan views that sequentially depict one method of removing the bottom tier of boards 70 from the unit of lumber 72. FIG. 3 shows the bunkfeeder 20 shortly after a user has loaded a unit 72. In this configuration, the unit 72 is resting in a generally horizontal position, with a left end 74 resting on the load supporting surface 41b and a right end 76 resting on the pushplate 40a. The other pushplate 40b is in a fully retracted position, inside the adjustable side assembly 24 and out of contact with the unit 72.

In FIG. 4, the hydraulic cylinder 42a retracts the pushplate 40a into the fixed side assembly 22. This allows right end 76 of the unit 72 to drop down onto the load supporting surface 41a, which causes the unit 72 to tip slightly. In this configuration, the lumber unit 72 is oriented at a slight angle to the horizontal with both ends 74 and 76 of the unit 72 resting on their respective load supporting surfaces 41a and 41b.

In FIG. 5, the pushplate 40b is extended out of the adjustable side assembly 24 and the pushplate 40a is substantially simultaneously retracted into the fixed side assembly 22. As a result, the pushplate 40b engages the left end 74 of the bottom tier 70 and pushes it off the load supporting surface 41b. This allows the left end 74 to drop away from the rest of the unit 72. FIG. 6 shows the bunkfeeder 20 and the unit 72 shortly after this step. As can be seen, bottom tier 70 is in an angled orientation, with the left end 74 of the bottom tier 70 resting on the conveyor chain assembly 28 and with the right end 76 extending into the fixed side assembly 22.

In FIG. 7, the hydraulic cylinder 42a extends the pushplate 40a out of the fixed side assembly 22 and the hydraulic cylinder 42b simultaneously retracts the pushplate 40b back into the adjustable side assembly 24. This causes the pushplate 40b to engage the right end 76 of the bottom tier 70 and to push it off of the load supporting surface 41a. As shown in FIG. 7, this action also forces the left end 74 of the bottom tier 70 into the cavity 68 below load supporting surface 41b.

FIG. 8 shows the bunkfeeder 20 and the unit 72 shortly after the pushplate 40b has returned to its fully extended position. Each end of the bottom tier 70 of boards 78 has dropped onto one conveyor chain assembly 28, and the tier 70 is completely separated from the rest of the unit 72. FIG. 8 also shows that the remaining portion of the unit 72 has returned to the generally horizontal orientation shown in FIG. 3, with the tier 80 resting on the surface 41b and on the pushplate 40a. Thus, the present invention can repeat the process depicted in FIGS. 3–8 to separate new bottom tier 80 in the unit 72. Those skilled in the art will appreciate that this process can be repeated to separate each tier in the unit 72 and that the hydraulic cylinder 42a will have a stroke length about twice that of hydraulic cylinder 42b.

Figure 9:
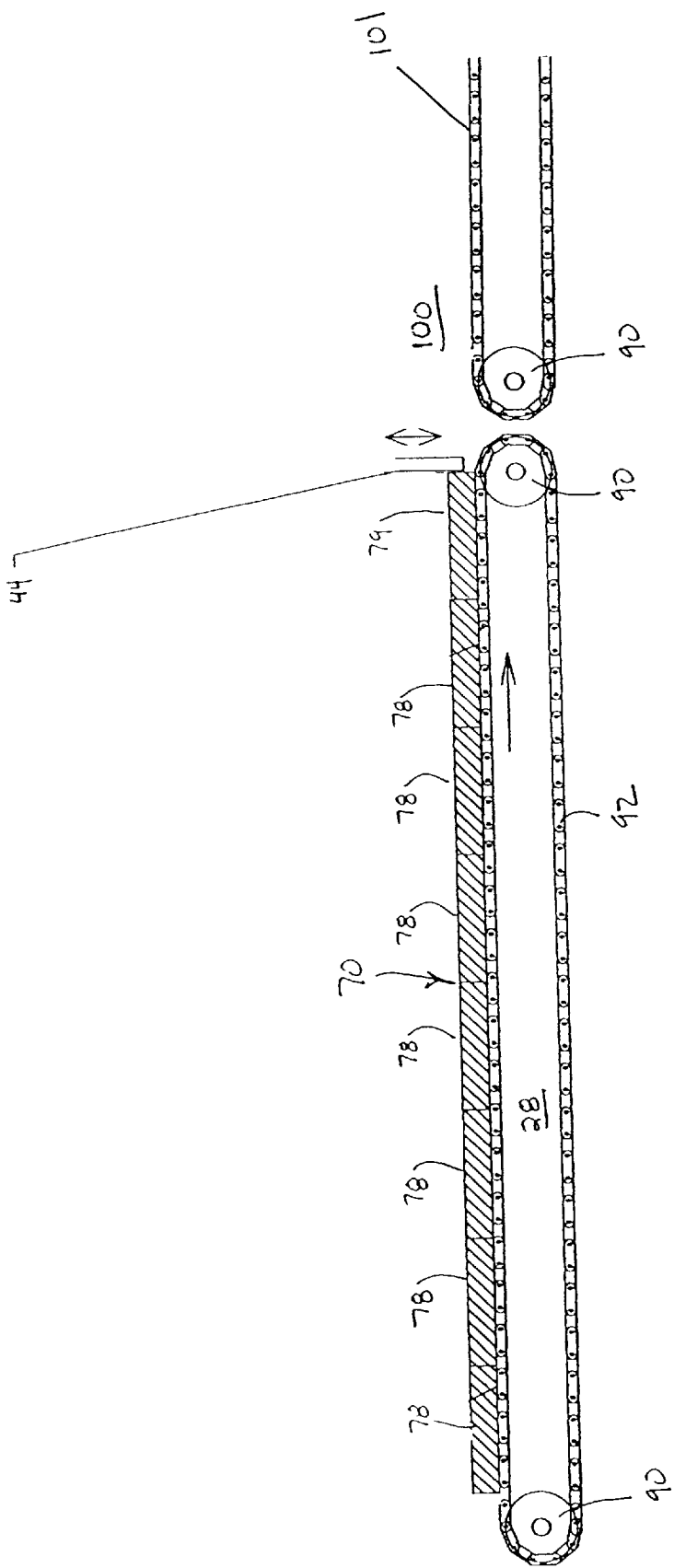

FIGS. 9 and 10 are detailed side plan views of one conveyor assembly 28 suitable for use as a tier receiver. The bunkfeeder 20 embodiment in FIGS. 1A and 1B comprises two of these conveyor assemblies 28, one of which being located near each end of the removed bottom tier. FIG. 9 shows the conveyor assembly 28 shortly after one end of the removed bottom tier 70 has dropped onto it (as depicted in FIG. 8). FIG. 10 shows the conveyor assembly 28 after the lifting bars 46a, 46b have separated one individual board 79 from the rest of the boards 78 in the tier 70.

In operation, the hydraulic drive motor 39 begins to drive the chain 92 in a clockwise direction (as depicted in FIGS. 9–10) for several seconds as soon as or shortly after the bottom tier 70 drops onto the conveyor assembly 28. This causes the chain 92 to bias the tier 70 of boards toward the finger stop 44. (Actually, each conveyor assembly 28 has its own finger stop 44a, 44b and lifter bar 46a, 46b. For simplicity, only one stop 44, and its corresponding lifter bar 46, is described.) The stop 44, however, is initially positioned close enough to the chain 92 to obstruct the board's 79 path. That is, the conveyor assembly 28 cannot move the rightmost board 79 past the finger stop 44 when the finger stop 44 is in this "blocking" position. This, in turn, causes the boards 78 and 79 to collect and align against the two finger stops 44.

After the boards 78 and 79 have collected and aligned themselves against each stop 44, the chain 92 is stopped. Next, as shown in FIG. 10, the lifter bar 46 and the finger stop 44 are simultaneously raised above the level of the chains 92. Because the end 95 of each lifter bar 46 is separated from the finger stop 44 by a distance slightly greater than the width of the individual board 79 ("gap" 96), this act causes the lifter bar 46 to engage and lift all of the boards 78, except the rightmost board 79, off of the conveyor assembly 28. The chain 92 is then restarted, which causes it to bias the remaining board 79 off the conveyor assembly 28 and into the discharge area 100. This discharge area 100 is typically the in-feed point for the machine 101 fed by the bunkfeeder 20.

After the isolated board 79 exits the bunkfeeder 20, the hydraulic cylinder 54 simultaneously lowers each lifter bar 46 and each finger stop 44 below the level of the chains 92. This sets the remaining boards 78 back on the chain 92. Next, the moving chain 92 biases the remaining boards 78 against each finger stop 44 until they are again in a configuration similar to that shown in FIG. 9. The present invention can then repeat these steps to isolate and individually eject the remaining boards 78 in the tier 70. After the last board 78 in the tier 70 is isolated and individually ejected, the bunkfeeder 20 will use the method described with reference to FIGS. 3–8 to separate the next new bottom tier 80 from the unit 72 and will begin to separate the boards in that tier 80.

Referring again to FIGS. 1A and 1B, the chain 60, the pinions 58, and the crank handle 66 allow the bunkfeeder 20 to be adjusted to accept different lengths of lumber. Specifically, the crank handle 66 is mechanically coupled to the pinion 58 by a suitable mechanism (not shown), such as a chain or a gear train. Turning the crank handle 66 causes the pinion 58 to rotate across the chain 60, which laterally biases the adjustable side assembly 24 along the parallel rails 26. The chain 60, the pinion 58, and the crank handle 66 in this embodiment are desirable because they are all relatively inexpensive and durable. However, other devices capable of moving and positioning the adjustable side assembly 24 are within the scope of the present invention. This specifically includes, without being limited to, a rack and pinion system, a power screw, and a hydraulic mechanism.

The latch 62 and the fixed latch pegs 64 may be used to help quickly position the adjustable side unit 24 in the correct location to receive standard lengths of lumber. The pegs in these embodiments are first positioned to correspond to standard lumber lengths. The adjustable side assembly 24 is then laterally moved away from the fixed side assembly 22 (i.e., toward the right as depicted in FIG. 1A) until one or both latches 62 catch one of the latch pegs 64. The peg 64 prevents further lateral motion, which leaves the adjustable side assembly 24 in the proper position to receive the standard length lumber. These embodiments are also desirable because ICS the latch 62 will help to prevent the adjustable side assembly 24 from moving unexpectedly and because users can quickly visually confirm that the latch 62 is engaged. Despite these advantages, however, the bunkfeeder 20 may be operated when the latch 62 is not engaged with a peg 64. This operational configuration may be desirable for nonstandard lumber lengths.

The lumber holdup arm assembly 36 comprises a generally cylindrical bar 97 that is pivotally connected to both rails 26 by two linking arms 98. The cylindrical bar 97 can be pivoted around its pivot point 91 from a lowered position to a raised position by the lifter hydraulic cylinder 54a. The lumber holdup arm assembly 36 is desirable because it helps prevent longer pieces of lumber from buckling during the tier separation procedure. That is, as described with reference to FIG. 5, the pushplate 40b pushes against the end of tier 70. This causes tier 70 to slide relative to tier 80. Frictional forces between tier 70 and tier 80, however, resist this relative motion. The force necessary to overcome the frictional forces can exceed the buckling strength of longer boards, particularly when the longer boards are made from a lower grade wood. Accordingly, the layer lifter hydraulic cylinder 54a biases the bar 97 against the tier 70, which provides additional lateral support for the boards.

The guide arms 57a and 57b may be any device capable of exerting a lateral force against the sides of the unit 72. This feature may be desirable because units of lumber 72 are typically held together by a circumferential metal or plastic band (not shown). This band, however, must be cut and removed before the bunkfeeder 20 can work properly. The lateral force exerted by the guide arms 57a and 57b replaces the circumferential force exerted by the bands and holds the unit 72 together inside the bunkfeeder 20. In one embodiment, the guide arms 57a and 57b are hollow steel bars and are connected to the rails by locking hinges 99. The locking hinges 99 allow the guide arms 57a and 57b to be pivoted out of the way during loading and then locked into a generally vertical position by a latch (not shown).

FIG. 11 is a detailed plan view of the fixed side assembly 22, as viewed from the discharge side. FIG. 11 depicts the pushplate 40a, the load supporting surface 41a, the pushplate hydraulic cylinder 42a, the finger stop 44a, the lifter bar 46a, the lifter arm 50a, the lifter hydraulic cylinder 54a, the angled load guide surface 55a, the synchronizing assembly 56a, and the guide arm 57a. FIG. 11 also depicts a reinforced vertical portion 82a of the angled guide surface 55a, an outer edge 84a of the load supporting surface 41a, sensors 86a and 88a, and a coupling mechanism 94a. Those skilled in the art will recognize that the adjustable side assembly 24 comprises complementary structures.

The angled guide surface 55a in this embodiment is a sheet of steel, aluminum, plastic or other relatively strong, lightweight material and is fixedly mounted to the side assembly 22 at an angle of between about ten and thirty degrees to the vertical. The angled guide surfaces 55 on both side assemblies guide the unit 72 of lumber into the configuration shown in FIG. 3. This feature is desirable because the user can quickly and easily load the bunkfeeder 20. The angled guide surfaces 55 are also desirable because they provide clearance for the unit 72 to tip into during the tier separating procedure described with reference to FIGS. 3–8. The angled guide surface 55a in some embodiments may include a reinforced vertical section 82a that helps to more accurately locate the unit 72 and gives the hydraulic cylinder 54a a stronger surface against which to push during the tier separation procedure.

The load supporting surface 41a in this embodiment may comprise a sheet of any relatively smooth planar material, such as steel, aluminum, or plastic, and may have a downward slope (i.e., in the direction of the other load supporting surface 41b) of between about one and thirty degrees. These embodiments are desirable because the slight downward slope helps to prevent the bottom tier 70 from binding to the next tier 80 during the tier separation procedure. That is, the weight of the unit 72 pressing down onto the right end 76, and the resultant frictional forces, have a tendency to briefly prevent the bottom tier 70 from dropping into the position depicted in FIG. 6. Adding a slightly downward slope to the load supporting surface 41a helps to direct the bottom tier 70 into the orientation in FIG. 6. Despite these advantages, however, horizontal load supporting surfaces 41a, 41b are also within the scope of the present invention.

The pushplate 40a can be any device capable of providing sufficient force against the end 76 of the bottom tier 70. The trapezoidal shaped pushplate 40a in this embodiment is desirable because its sloped top surface helps to gently lower the tiers 70 and 80 as they drop onto the tier receiving surfaces 41a (see FIGS. 3–8). However, pushplates 40a having other shapes are within the scope of the present invention. This specifically includes, without being limited to, generally rectangular and cylindrical pushplates 40a.

The synchronizing assembly 56a in this embodiment comprises a torsion bar 87a and two lever arms 89a. The two lever arms 89a are fixedly connected to the torsion bar 87a and are pinned to the pushplate 40a, with one lever arm 89a located near each side of the fixed side assembly 22. The torsion bar 87a, in turn, is rotatably connected to the fixed side assembly 22 by roller-element bearings, bushings, or similar mounting devices. The synchronizing assembly 56a is desirable because it helps keep the pushplate 40a in a substantially parallel orientation with the outer edge 84a of the load supporting surface 41a, which ensures that the ends of all items in the tier fall from their associated supporting surface at substantially the same time. That is, the bunkfeeder 20 is designed to accept units 72 having different widths. This means, however, that portions of the pushplate 40a may not contact small and/or narrow units 72. The forces generated by this unbalanced contact can push the pushplate 40a out of its proper orientation (i.e., parallel to the edge 84a of the load supporting surface 41a). The synchronizing assembly 56a couples the two outer ends of the pushplate 40a together, thereby helping to prevent any misalignment. Other means of holding the pushplate 40a in its proper orientation are also within the scope of the present invention. This specifically includes, without being limited to, multiple hydraulic cylinders 42a, trusses that support the ends of the pushplate 40a, and guide surfaces designed to center the unit 72 with respect to the pushplates 40.

The sensor 86a may be any device capable of detecting the presence of a board 78 on the chain 92. Suitable sensors include, without being limited to, photoelectric devices ("electric eyes") and electrical switches that are actuated by physical contact with the board. In some embodiments the sensor 86a is positioned adjacent to the finger stop 44 so that it can detect the presence of the board 79 against the finger stop 44. This position is desirable because the signal from the sensor 86a can be used to detect when the boards 78 in the separated bottom tier 70 have collected against the finger stop 44 and whether un-isolated boards 78 remain in the tier 70. This position is also desirable because the sensor 86a can detect when the isolated board 79 has been pushed out of the bunkfeeder 20, thus allowing the bunkfeeder 20 to automatically compensate for different heights of boards. That is, the PLC 38 can continue raise the finger stop 44 until the sensor 86a detects that the board 79 begins to move or until the board 79 enters the discharge area 100.

The sensor 88a may similarly be any device capable of detecting whether any tier 70 remains in the unit 72. Suitable sensors include, without being limited to, photoelectric devices ("electric eyes") and electrical switches that are actuated by physical contact with boards 78 in the tier 70. The sensor 88a is desirable because its signal can be used to detect when the bunkfeeder 20 must be reloaded with more tiers 70 and 80. The signal, in turn, can be used to provide an alarm indicating that the bunkfeeder 20 is empty.

The coupling mechanism 94a prevents relative rotation between lifter bar 46a and the finger stop 44a, but selectively permits them to slide longitudinally relatively to each other. This coupling mechanism 94a is desirable because it allows the bunkfeeder 20 to separate different sizes of lumber. That is, as described with reference to FIGS. 9 and 10, a gap 96 should exist between the finger stop 44a and the lifter board 46a to allow the lifter bar 46a to separate one board 79 from the tier 70. This gap 96 should be slightly greater than the width of the board 79. Accordingly, coupling mechanisms 94a that selectively allow for relative longitudinal motion are desirable because the user can adjust the gap width 96 for different sized boards. Despite these advantages, however, the finger stop 44a and the lifter bar 46a in some embodiments may be longitudinally fixed with respect to each other.

The lifter bar 46a in some embodiments may be used to lower the tier 70 onto the conveyor 28. In these embodiments, the hydraulic cylinder 54a biases the lifter bar 46a upward until it is located a short distance below the load supporting surfaces 41. In this position, the lifter bar 46a can catch the bottom tier 70 when the pushplate 40a pushes it off of the load supporting surface 41a and can gently lower the bottom tier 70 onto the conveyor assembly 28. These embodiments are desirable because individual boards 78 sometimes bounce when they hit the conveyor assembly, which may lead to a "logjam." Raising the lifter bar 46a and catching the bottom tier 70 decreases the distance that the tier 70 will drop. This, in turn, decreases the likelihood of a log jam.

The PLC 38 can be any device capable of coordinating the timing and duration of the various acts described with reference to FIGS. 3–8 and 9–10. Accordingly the PLC 38 should be operably connected to the hydraulic power unit 28, the pushplate hydraulic cylinders 42a, 42b; the layer lifter hydraulic cylinders 54a, 54b; and the drive motors 39a, 39b. In some embodiments, the PLC 38 controls the bunkfeeder 20 based on predetermined time intervals. These intervals may be determined by manually controlling the bunkfeeder 20 for at least one cycle, then providing the appropriate values to the PLC 38. In other embodiments, the PLC 38 uses feedback from the sensors 86 and 88 and from the machine 101 feed by the bunkfeeder 20. Other control methods are also within the scope of the present invention. This specifically includes, without being limited to, a combination of the "time interval" and "feedback" methods.

In some embodiments, the acts described with reference to FIGS. 3–8 and 9–10 are each assigned a unique sequence number. The PLC 38 can store this unique sequence number in a non-volatile memory device, such as electrically erasable programmable read-only memory ("EEPROM"), bubble memory, battery backed-up random access memory ("RAM"), or an electromechanical counter. These embodiments are desirable because the PLC 38 can use the stored sequence number to complete its operating cycle from any starting condition. Thus, the bunkfeeder 20 in these embodiments can be stopped or shut-off before it completely separates its stack and/or its tier.

Although the present invention has been described in detail with reference to certain embodiments thereof, it may be embodied in other specific forms without departing from the essential spirit or attributes thereof. For example, the present invention can be used to unload materials other than lumber or boards. This specifically includes, without being limited to, pipes, beams, bars, and sheets made from metal, plastic, or wood. In addition, the present invention may be refilled before the bunkfeeder 20 is empty. This will allow the bunkfeeder 20 to provide a substantially continuous output of boards 79.

The present invention offers many advantages over conventional lumber unloading and feeding devices. For example, the present invention will accept most standard sized lengths, widths, and heights of lumber with minimal adjustment. The present invention also minimizes the risk of log jams and can be used in relatively confined areas. In addition, the present invention can both separate individual tiers from a unit of lumber and can separate individual boards from the tier.

Those skilled in the art will recognize that the accompanying figures and this description depicted and described embodiments of the present invention, and features and components thereof. With regard to means for fastening, mounting, attaching or connecting the components of the present invention to form the mechanism as a whole, unless specifically described otherwise, such means were intended to encompass conventional fasteners such as machine screws, nut and bolt connectors, machine threaded connectors, snap rings, screw clamps, rivets, nuts and bolts, toggles, pins and the like. Components may also be connected by welding, friction fitting, adhesives, or deformation, if appropriate. Unless specifically otherwise disclosed or taught, materials for making components of the present invention were selected from appropriate materials, such as metal, metallic alloys, fibers, polymers and the like, and appropriate manufacturing or production methods including casting, extruding, molding and machining may be used. In addition, any references to front and back, right and left, top and bottom and upper and lower were intended for convenience of description, not to limit the present invention or its components to any one positional or spacial orientation. Therefore, it is desired that the embodiments described herein be considered in all respects as illustrative, not restrictive, and that reference be made to the appended claims for determining the scope of the invention.

What is claimed is:

1. An apparatus for separating items from a tiered load, comprising:
   (a) a first load supporting surface and a second load supporting surface that cooperate to support a first end and a second end of at least one tier;
   (b) a tier receiver located below the first and second load supporting surfaces;
   (c) a first pusher that biases the first end of the tier off the first load supporting surface; and
   (d) a second pusher that biases the second end of the tier off the second load supporting surface, thereby allowing the tier to drop onto the tier receiver.

2. The apparatus of claim 1, wherein the tier receiver comprises a conveyor.

3. The apparatus of claim 2, wherein the tier comprises a plurality of units and wherein the conveyor biases the plurality of units against a stop.

4. The apparatus of claim 3, further comprising a lifter adapted to bias all but one unit in the plurality of units out of engagement with the conveyor.

5. The apparatus of claim 4, further comprising an actuator adapted to selectively remove the stop, thereby allowing the conveyor to bias the one unit into a discharge area.

6. The apparatus of claim 1, wherein the first pusher comprises a hydraulic cylinder operably connected to a pushplate.

7. The apparatus of claim 1, wherein the second pusher comprises a hydraulic cylinder operably connected to a pushplate.

8. The apparatus of claim 1, further comprising an arm adapted to lower the tier onto the tier receiver.

9. The apparatus of claim 1, wherein the first load supporting surface is adjustable with respect to the second load supporting surface.

10. The apparatus of claim 1, wherein the second load supporting surface is sloped.

11. The apparatus of claim 1, further comprising a synchronizing assembly adapted to align the first pusher with an edge of the first load supporting surface.

12. An apparatus for unloading and feeding lumber, comprising:
   (a) a first load supporting surface and a second load supporting surface that cooperate to support the first and second ends respectively of a unit of lumber, the unit of lumber comprising a tier of boards;
   (b) a conveyor that biases the tier of boards against a stop and is located below the first and second supporting surfaces;
   (c) a lifter arm that selectively lifts all but one board in the tier of boards off of the conveyor;
   (d) a first pusher that biases the first end of the tier off the first load supporting surface;
   (e) a second pusher that biases the second end of the tier off the second load supporting surface, thereby allowing the tier to drop onto the conveyor.

13. A method of separating items from a tiered load, comprising:
   (a) placing a plurality of tiers on a first load supporting surface and a second load supporting surface, the plurality of tiers including a first tier;
   (b) pushing a first end of the first tier off the first load supporting surface; and
   (c) pushing a second end of the first tier off the second load supporting surface, whereby the first tier drops onto a tier receiver.

14. The method of claim 13, wherein the first tier comprises a plurality of items.

15. The method of claim 14, further comprising:
   collecting the first tier that has dropped onto the tier receiver against a stop associated with the tier receiver; and
   allowing on e item in the plurality of items past the stop.

16. The method of claim 14, wherein the tier receiver is a conveyor and further comprising:

using the conveyor to bias the first tier against the stop;

lifting all but one item in the plurality of items off the conveyor;

removing the stop; and using the conveyor to bias the one item into a discharge area.

17. The method of claim 13, wherein the plurality of tiers comprises a second tier and further comprising:

(a) pushing a first end of the second tier off the first load supporting surface; and (b) pushing a second end of the second tier off the second load supporting surface, whereby the second tier drops onto the tier receiver.

18. A method of unloading a unit of lumber, wherein the unit of lumber includes a bottom tier and wherein the bottom tier includes a plurality of boards, the method comprising:

(a) positioning a first load supporting surface and a second load supporting surface, whereby the first load supporting surface and a second load supporting surface cooperate to receive the unit of lumber;

(b) supporting the unit of lumber on the first load supporting surface and the second load supporting surface;

(c) biasing a first end of the bottom tier off the first load supporting surface;

(d) biasing a second end of the bottom tier off the second load supporting surface, whereby the bottom tier drops onto a conveyor;

(e) biasing the bottom tier against a stop;

(f) lifting all but one board in the bottom tier off the conveyor; and (g) removing the stop, whereby the conveyor biases the one board into a discharge area.

* * * * *